(12) United States Patent
Asher et al.

(10) Patent No.: US 7,860,012 B2
(45) Date of Patent: Dec. 28, 2010

(54) EMPLOYING PARALLEL PROCESSING FOR ROUTING CALLS

(76) Inventors: Michael Asher, 411 Walnut St. #1913, Green Cove Springs, FL (US) 32043; Christopher Giles, 2178 Franklin St., Auburn, AL (US) 36830

( * ) Notice: Subject to any disclaimer, the term of this patent is extended or adjusted under 35 U.S.C. 154(b) by 187 days.

(21) Appl. No.: 12/002,630

(22) Filed: Dec. 18, 2007

(65) Prior Publication Data

US 2009/0154360 A1    Jun. 18, 2009

(51) Int. Cl.
*G01R 31/08* (2006.01)
(52) U.S. Cl. ........................ 370/238; 370/252
(58) Field of Classification Search ............. 370/238, 370/252
See application file for complete search history.

(56) References Cited

U.S. PATENT DOCUMENTS

| | | | | |
|---|---|---|---|---|
| 5,471,580 A | * | 11/1995 | Fujiwara et al. | 709/249 |
| 5,521,091 A | * | 5/1996 | Cook et al. | 435/264 |
| 5,881,243 A | * | 3/1999 | Zaumen et al. | 709/241 |
| 6,098,107 A | * | 8/2000 | Narvaez-Guarnieri et al. | 709/239 |
| 6,104,699 A | * | 8/2000 | Holender et al. | 370/235 |
| 6,631,421 B1 | * | 10/2003 | Steele et al. | 709/249 |
| 7,391,742 B2 | * | 6/2008 | Zabele et al. | 370/254 |
| 2003/0223373 A1 | * | 12/2003 | Nakamura et al. | 370/238 |
| 2004/0205237 A1 | * | 10/2004 | Doshi et al. | 709/241 |
| 2007/0263544 A1 | * | 11/2007 | Yamanaka et al. | 370/238 |
| 2007/0276709 A1 | * | 11/2007 | Trimby et al. | 705/6 |
| 2007/0280199 A1 | * | 12/2007 | Rong | 370/351 |
| 2009/0132989 A1 | * | 5/2009 | Ou et al. | 716/13 |

* cited by examiner

*Primary Examiner*—Kwang B Yao
*Assistant Examiner*—Jung Liu
(74) *Attorney, Agent, or Firm*—Henry T. Brendzel

(57) ABSTRACT

A least-cost path between a pair of nodes A and B of a network is realized by segmenting the network into three or more segments, with nodes A and B being in different ones of the segments, with the third or more other segments being interposed between the segments to which nodes A and B belong, concurrently process the different segment to identify paths and their associated costs, and processing results generated by the different processing units to compute the least-cost path. Advantageously, the segmenting is chosen to equalize the work load of the different processing units so that the units finish their task roughly at the same time.

14 Claims, 2 Drawing Sheets

○ NODE
■ TERMINAL

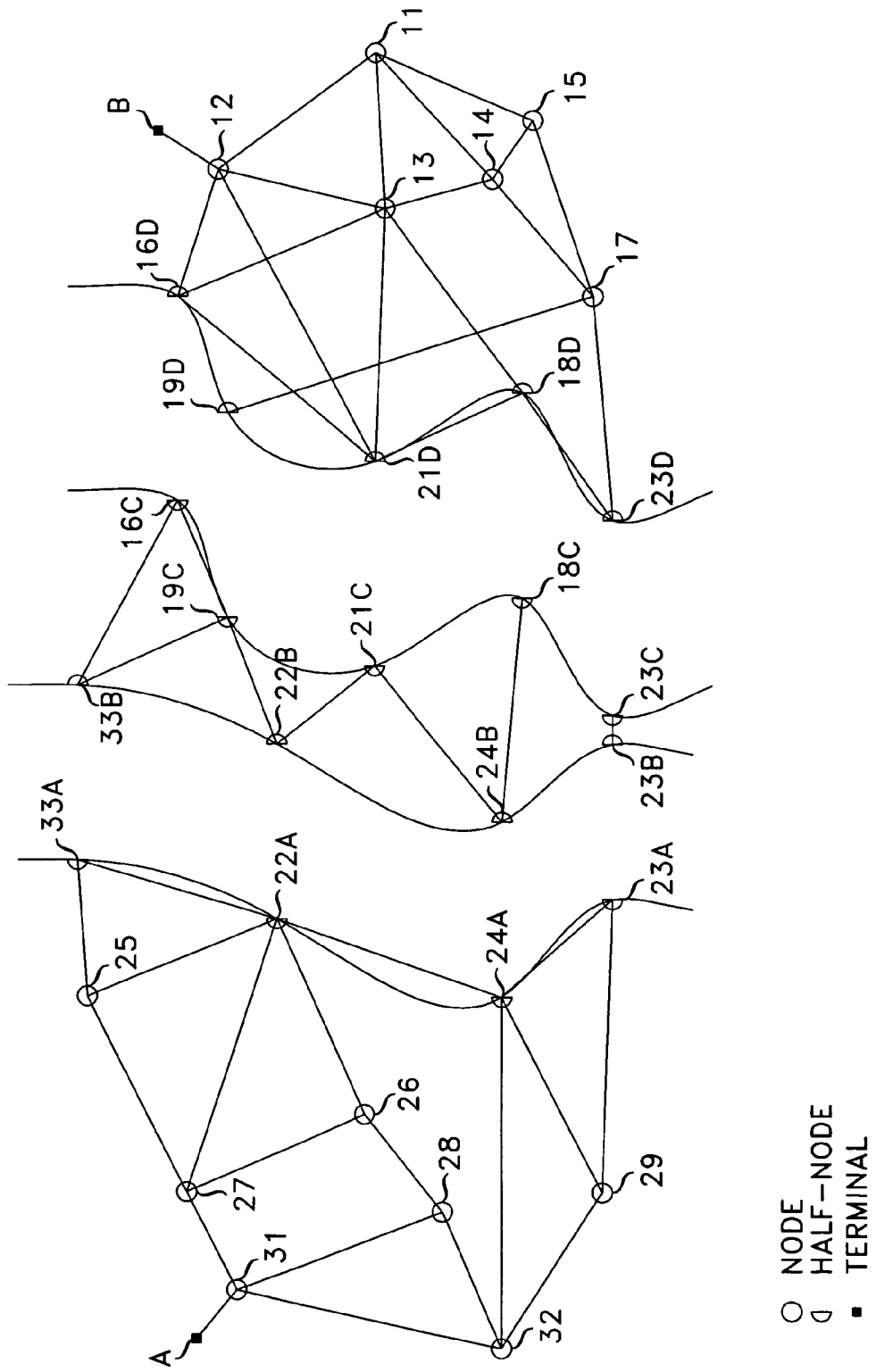

US 7,860,012 B2

EMPLOYING PARALLEL PROCESSING FOR ROUTING CALLS

BACKGROUND OF THE INVENTION

This invention relates to network routing, and more particularly to routing through networks that can be represented as Euclidian graphs, such as a telecommunications network that comprises a plurality of nodes, and links that interconnect the nodes.

A digraph is a representation of a network, converted into nodes and edges. Euclidian graphs are undirected graphs for which nodes have real and distinct physical positions and whose edge weights correlate, at least roughly, to the Euclidian distance between nodes. Various networks have this characteristic, such as telecommunication networks and road networks. One task that is often required in connection with networks is to identify a least-cost path, or paths, between nodes of the network. Algorithms exist for finding such least-cost paths, but because the computation burden of these algorithms is generally proportional to the number of network nodes raised to a power that is greater than 1, and the number of nodes in any reasonable-sized telecommunications network is large, the computations of a least-cost path is quite burdensome.

One approach for obtaining a solution to a least-cost path problem is to employ an algorithm that is parallelizable; that is, an algorithm whereby the problem can be divided into segments and the segments can be processed concurrently by separate processors. When the problem to be addressed is to find a set of least cost paths between N terminal points in one grouping and N terminal points in another grouping, it can divided into N problems, each solving a single-pair-shortest-path (SPSP) problem. However, finding the shortest path between a given pair of terminal points is still quite burdensome when the number of network nodes is large. Tree decomposition methods work, but the decomposition can be more expensive (in terms of processing burden) than the path-finding operation itself.

An algorithm that takes advantage of the attribute of Euclidian graphs, mentioned above, is disclosed in co-pending application titled "An Algorithm for Network Route Selection," filed in the US Patent Office on Jun. 12, 2007, but this solution is an approximation, and the algorithm is not parallelizable.

SUMMARY OF THE INVENTION

An advance in the art of identifying a least-cost path between a pair of nodes A and B is realized by (a) segmenting the network into three or more segments, with nodes A and B being in different ones of the segments, with the third or more other segments being interposed between the segments to which nodes A and B belong, (b) concurrently process the different segment to identify paths and their associated costs, and (c) processing results generated by the different processing units to compute the least-cost path. Advantageously, the segmenting is chosen to equalize the work load of the different processing units so that the units finish their task roughly at the same time. The network is segmented with cut "lines" that go through and divide nodes into two halves, or cut links to create a pair of phantom nodes.

BRIEF DESCRIPTION OF THE DRAWINGS

FIG. 2 presents the FIG. 1 network as it is cut into three segments; and

DETAILED DESCRIPTION

Figure 1:
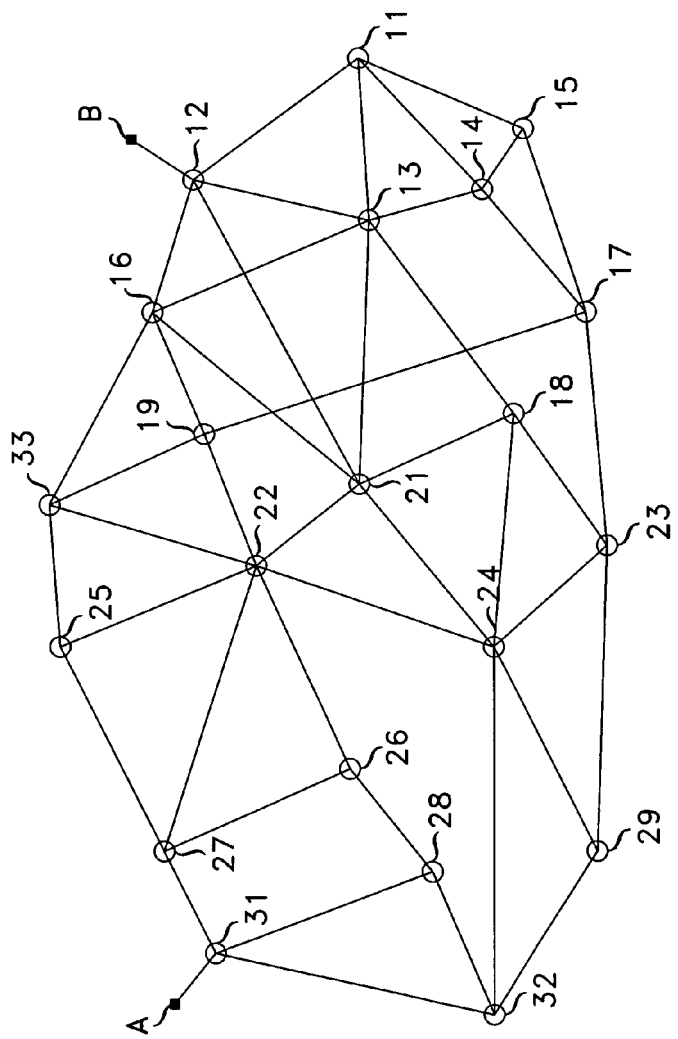
FIG. 1 presents an illustrative network.

FIG. 1 depicts a network where a path needs to be established between nodes 31 and 12. Illustratively, the FIG. 1 network is a telecommunication network where nodes 31 and 12, or more particularly customer terminals A and B that are coupled to nodes 31 and 12, respectively, need to be interconnected. Therefore, it is desirable to identify a least-cost path between them nodes 31 and 12.

In accord with the principles disclosed herein, the FIG. 1 network is divided into a number of segments. If the pair of nodes 31-12 is viewed to be lying on a latitude line, the segmenting is basically along longitude lines. Illustratively, the FIG. 1 network is segmented to form a first network segment that includes customer terminal A, a second network segment that includes customer terminal B, and a third network segment therebetween. The segmenting can be with cuts through network links, forming a pair of phantom half-nodes at the cut-point of each link, with one of the phantom half-nodes belonging to one of the segments, the other of the phantom half-nodes belonging to the other the segments, and the costs of the links divided up between the two cut segments of the link. Alternatively, the segmenting can be delineated by cuts through nodes, creating two half-nodes from each "cut" node, with one of the half nodes belonging to one of the segments and the other of the half nodes belonging to the other of the segments.

The network is segmented so that each segment can be processed independently, and as disclosed more fully below, it is particularly advantageous to segment the network so that the processing of each segment takes approximately the same time. The processing within a segment can be assigned to more than one processor, again with the goal of having all processing that is done concurrently be concluded at approximately the same time.

FIG. 2 depicts such a segmenting, with a first segment (to which terminal A belongs) including $V_1=6$ nodes (not counting node 31), $N_1=4$ half-nodes, and $E_1=18$ paths within the segment; the second segment (to which terminal B belongs) includes $V_2=5$ nodes (not counting node 12), $N_2=5$ half nodes, and $E_2=19$ paths within the segment; and the third segment includes $V_3=0$ nodes, $Nl_3=4$ half nodes at the left border, $Nr_3=5$ half nodes at the right border, and $E_3=8$ paths within the segment.

Noting that node 23 belongs to the interface with the first segment and well as with the second segment, it need not be included in any least-cost path identification algorithm (since it is known that there is only one path from the interface with the first segment to the interface with the second segment, and the cost of that path is zero). Indeed, FIG. 1 actually depicts this zero-cost path between nodes 23B and 23C. Therefore, the third segment may be said to have $V_3=0$ nodes, $Nl_3=3$ half nodes at the left border, $Nr_3=4$ and $E_3=7$ paths within the segment.

Since for purposes of the processing carried out by the path identification and cost determination algorithm the half nodes are counted as full nodes, the FIG. 2 segmentation yields a first segment with 11 links and 10 nodes, a second segment with 19 links and 10 nodes, and the third segment with n=3, 7 nodes and 7 links As for the connection from one segment to another, that is from one half-node to a corresponding half-node, for purposes of the algorithms executed herein, a pair of corresponding half-nodes is interconnected by a link of zero cost. Also, in the course of executing the algorithm relative to a segment, a half-node is considered as a full node.

Figure 3:
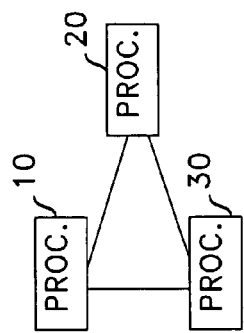
FIG. 3 is a block diagram of a hardware embodiment in which the method disclosed herein may be practiced.

An apparatus that computes the least-cost path between node 31 and node 12 is illustrated in FIG. 3 as having processors 10 and 20 that are adapted to communicate with processor 30. The FIG. 3 apparatus can actually also be a single multi-processor computer. Illustratively, the network segment that includes node 31 is assigned to processor 10, the network segment that includes node 12 is assigned to processor 20 and the remaining network segment is assigned to processor 30.

The task of processor 10 is to compute the costs from node 31 to the four nodes that form the interface of the first network segment with the third network segment. This computation is, illustratively, carried out using the conventional Dijkstra algorithm. Similarly, the task of processor 20 is to compute the costs from node 12 to the five nodes that form the interface of the second network segment with the third network segment, and it is also illustratively carried out using the conventional Dijkstra algorithm.

The task of processor 30 is to compute the costs between the $Nl_3$ left-side nodes of the third segment and the $Nr_3$ right-side of the third segment, as well as identify the final least-cost path. In an embodiment that employs the Dijkstra algorithm, this corresponds to n runs of the algorithm, where n is the lower of $Nl_3$ and $Nr_3$; which in the illustrative example of FIG. 2 is 4.

Unlike the network of FIGS. 1 and 2, actual networks often are highly interconnected, which means that the number of paths, E, is significantly greater than the number of nodes V. In such circumstances, the time required to arrive at a solution of the Dijkstra algorithm is on the order of E log V; i.e., $T(E,V)=0(E \log V)$. Hence, the time required by the FIG. 3 apparatus to identify the various costs when processors 10, 20, and 30 work concurrently, is the greater of $T_1(E,V)=0(E_1 \log V_1)$ for the first segment, $T_2(E,V)=0(E_2 \log V_2)$, and $T_3(E,V)=n[O(E_3 \log V_3)]$ for the third segment.

The processing time for a segment can be reduced by choosing a segmentation that yields fewer nodes and paths in that segment. However, such segmentation increases the number of paths and nodes in another segment which, in turn, increases the processing time for that other segment. That is, reducing the time for one of the processors increases the time for the other processor or processors.

Clearly, it is desirable to segment the network so as to make the processing times of the individual processors as equal to each other as possible, and in accord with one feature of this disclosure the segmenting of the network is effected to achieve this goal. By approximately equal to each other, or roughly equal to each other, it is meant that the shortest processing time is not less than 75% of the longest processing time.

That means that the segmentation is unequal in terms of the portion of the network that is assigned to each segment. More particularly, when each segment is assigned to a single processor, to a first degree of approximation the segmentation should be such that the number of links, E, in the first segment should be the same as the number of links in the second segment, and n times larger than the number of links in the third segment. The segmentation chosen in FIG. 2 yields processing times of O(18 log(10)), O(19 log(11)), and 3[O(7 log(7))] for processors 10, 20 and 30, respectively, which times are fairly close to each other.

Once the various costs are known, a determination of the least-cost path is made by processor 30, and that corresponds to a simple selection of one out of $Nl_3 \times Nr_3$ costs, which is not a burdensome proposition.

It may be noted that in connection with each of the segments other than the segments that contain terminals A and B, where there are $Nl_m$ left interface nodes and $Nr_m$ right interface nodes, a solution of an all-pair-all-paths problem is required. With a single processor assigned to such a segment, the processing burden, as mentioned above, is $n[O(E_m \log V_m)]$, where n is the smaller of $Nl_m$ and $Nr_m$. However, this processing burden can be divided between n processors that operate in parallel.

The invention claimed is:

1. A method executed in a computer for identifying a least-cost path between a node A of a network (node $Nl_1$) of nodes that are interconnected by links and a node B (node $Nr_2$) the network, where associated with each link is a cost measure for traversing the link, comprising the steps of:
   dividing the network into a chosen number $M \geq 3$ segments, where
   a first one of the segments contains said node A, some of said nodes, some of said links, and a first plurality of half nodes formed from some of said nodes (half nodes $Nr_1$),
   a second one of the segments contains node B, some of said nodes, some of said links, and a second plurality of half nodes formed from some of said nodes (half nodes $Nl_2$), and
   remainder of said M segments between said segment and said second segment, each one of said segments in said remainder segments having a plurality of half nodes $Nl_i$ and a plurality of half nodes $Nr_i$, and some of said nodes and some of said links interposed between the half nodes, where index $3 \leq i \leq M$ designates the segments;
   in connection with each of the M segments, executing, substantially concurrently, an associated algorithm to compute least-cost intra-segment path costs, where an intra-segment path extends from a left node $Nl_i$ of said segment to a right node $Nl_k$ of said segment and comprises links of only said segment, and an intra-segment path cost is a sum of the costs associated with the links of which the intra-segment path is comprised;
   identifying said least-cost path between said node A and said node B using results of the substantially concurrent executions of the algorithms associated with said segments; and
   employing said least-cost path for establishing communication between said node A and said node B;
   where each left half segment in a segment belongs to a node that has a half node in another segment, and said dividing selects a portion of said network for each of said segments to include a number nodes and a number of links that result in approximately the same processing time for said segments.

2. The method of claim 1 where said algorithm is a Dijkstra algorithm.

3. The method of claim 1 where said step of dividing the network creates segments where number of links and nodes in said first segment is approximately the same as number of links and nodes in said second segment, and number of links and nodes in segments i>2 is significantly smaller than number of links and nodes in said first segment.

4. The method of claim 1 where said step of dividing the network creates:
   a first segment with $V_1$ nodes and half nodes and $E_1$ links;
   a second segment with $V_2$ nodes and half nodes and $E_2$ links;
   at least a third segment having $Nl_i$ half nodes and $Nr_i$ half nodes, $V_3$ nodes and said half nodes, and $E_3$ links, where $E_1 \log V_1$, $E_2 \log V_2$, and $n(E_3 \log V_3)$, where n is the smaller of $Nl_i$ and $Nr_i$, are approximately equal to each other.

5. The method of claim 1 where said step of executing comprises:
   executing a first algorithm to compute costs of paths from node A to said first plurality of half nodes; and
   executing a second algorithm, concurrently with the execution of the first algorithm, to compute costs of paths from node B to said second plurality of half nodes.

6. The method of claim 5 where first algorithm and the second algorithm treat the half nodes as bona fide nodes.

7. The method of claim 6 where one or both of the first algorithm and the second algorithm are a Dijkstra algorithm.

8. The method of claim 6 where said network has a Euclidean nature, and one or both of the first algorithm and the second algorithm are an approximation algorithm that is based on the Euclidean nature of said network.

9. The method of claim 1 where the executing of the first algorithm is on a different processing element than the executing of the second algorithm.

10. The method of claim 1 where each of said segments i>2 comprise a left plurality of half nodes, a right plurality of half nodes, zero or more nodes therebetween, and a set of links that interconnect said left plurality of half nodes, said right plurality of half nodes, and said nodes.

11. The method of claim 9 where the substantially concurrent executions are carried out on distinct processing elements.

12. The method of claim 1 where
   said algorithm that is associated with said segments i>2 is carried out by a set of processors equal in number to lesser of Nl and Nr.

13. The method of claim 1 where each of said associated algorithms has a processing time that is proportional to both number of nodes and number of links in the associated processed segment.

14. The method of claim 1 where an edge node of a segment may be an actual node of said network or a phantom node that is a node which is interposed in a link.

* * * * *